(12) United States Patent
Zou et al.

(10) Patent No.: US 10,958,180 B2
(45) Date of Patent: Mar. 23, 2021

(54) DC-DC CONVERTER FOR WIDE INPUT VOLTAGE

(71) Applicant: Huazhong University of Science and Technology, Hubei (CN)

(72) Inventors: Xudong Zou, Hubei (CN); Shuang Liu, Hubei (CN); Qingbo Tang, Hubei (CN); Wenchao Jiang, Hubei (CN); Changle Xu, Hubei (CN); Weibin Jiang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 240 days.

(21) Appl. No.: 16/308,599

(22) PCT Filed: May 25, 2018

(86) PCT No.: PCT/CN2018/088312
§ 371 (c)(1),
(2) Date: Dec. 10, 2018

(87) PCT Pub. No.: WO2019/128071
PCT Pub. Date: Jul. 4, 2019

(65) Prior Publication Data
US 2020/0287461 A1 Sep. 10, 2020

(30) Foreign Application Priority Data
Dec. 29, 2017 (CN) .......................... 2017 1 1472232

(51) Int. Cl.
*H02M 3/335* (2006.01)
*H02M 3/158* (2006.01)
(Continued)

(52) U.S. Cl.
CPC ....... *H02M 3/33569* (2013.01); *H02M 3/158* (2013.01); *H02M 1/083* (2013.01);
(Continued)

(58) Field of Classification Search
CPC . H02M 2001/0058; H02M 2001/0067; H02M 2001/007
See application file for complete search history.

(56) References Cited

U.S. PATENT DOCUMENTS

| 2011/0292703 | A1 | 12/2011 | Cuk | |
|---|---|---|---|---|
| 2014/0268888 | A1* | 9/2014 | Lv | H02M 1/088 363/10 |
| 2017/0085189 | A1* | 3/2017 | Madsen | H02M 7/5383 |

FOREIGN PATENT DOCUMENTS

| CN | 204810151 U | 11/2015 |
|---|---|---|
| CN | 107994772 A | 5/2018 |

OTHER PUBLICATIONS

International Search Report and Written Opinion issued in PCT/CN2018/088312, dated Sep. 17, 2018.

* cited by examiner

*Primary Examiner* — Alex Torres-Rivera
*Assistant Examiner* — David A. Singh
(74) *Attorney, Agent, or Firm* — Hamre, Schumann, Mueller & Larson, P.C.

(57) ABSTRACT

A DC-DC converter includes an inductor, a rectifier module, a first bridge arm topology and a second bridge arm topology and a third bridge arm topology in parallel as well as a capacitor, wherein the first bridge arm topology includes a first switching tube and a fourth switching tube in series, the second bridge arm topology includes a second switching tube and a fifth switching tube in series, and the third bridge arm topology includes a third switching tube and a sixth switching tube in series; the inductor has one end connected
(Continued)

to a coupling point formed by connecting the first switching tube and the fourth switching tube in series, and the other end connected to a coupling point formed by connecting the second switching tube and the fifth switching tube in series.

9 Claims, 1 Drawing Sheet

(51) Int. Cl.
 *H02M 1/00* (2006.01)
 *H02M 1/08* (2006.01)
(52) U.S. Cl.
 CPC ................ *H02M 2001/007* (2013.01); *H02M 2001/0058* (2013.01); *H02M 2001/0067* (2013.01)

DC-DC CONVERTER FOR WIDE INPUT VOLTAGE

BACKGROUND OF THE INVENTION

Technical Field

The present invention relates to the field of switching power supplies, and more particularly relates to a DC-DC converter.

Description of the Related Art

The DC-DC converter is a widely used power electronic device, which controls on/off of the switches in combination with passive energy storage devices such as inductors and capacitors to convert an input direct current into another direct current with a fixed voltage or an adjustable voltage, including direct DC-DC converter and indirect DC-AC-DC converter. The direct DC-DC converter is also known as a chopper circuit, and there are six basic chopper circuits: buck chopper circuit (also known as Buck converter), boost chopper circuit (also known as Boost converter), buck-boost chopper circuit (also known as Buck-Boost converter), Cuk chopper circuit, Sepic chopper circuit and Zeta chopper circuit. The direct DC converter does not have an isolated transformer, while an indirect DC converter is formed by adding an AC part in the DC converter, that is, an isolated transformer is usually provided between the input and output ends, and thus the indirect DC converter is also called a DC converter with an isolated transformer. In the current switching power supplies, the indirect DC converter is the main structural form in the current applications.

At the same time, in industrial applications, DC voltages with multiple voltage levels are usually required, and the DC-DC converter with multiple output ports can achieve more compact structure and saved cost while meeting the requirement of multi-voltage-level output. Through rational design, the present invention proposes a DC-DC converter topology with two output ports based on a basic DC converter.

SUMMARY OF THE INVENTION

In view of the above-described defects or improvement requirements in the art, the present invention provides a DC-DC converter, which aims to solve the technical problem that the existing DC-DC converter is not high in efficiency and power density.

In order to achieve the above objective, the present invention provides a DC-DC converter, comprising: a DC-DC converter, characterized by comprising: an inductor, a rectifier module, a first bridge arm topology and a second bridge arm topology and a third bridge arm topology in parallel as well as a capacitor, wherein the first bridge arm topology includes a first switching tube and a fourth switching tube in series, the second bridge arm topology includes a second switching tube and a fifth switching tube in series, and the third bridge arm topology includes a third switching tube and a sixth switching tube in series; a negative pole of the first bridge arm topology is connected to a negative pole of the second bridge arm topology, and the inductor has one end connected to a coupling point formed by connecting the first switching tube and the fourth switching tube in series, and the other end connected to a coupling point formed by connecting the second switching tube and the fifth switching tube in series; an input end of the rectifier module has one end connected to the coupling point formed by connecting the second switching tube and the fifth switching tube in series, and the other end connected to a coupling point formed by connecting the third switching tube and the sixth switching tube in series, and the rectifier module is used to convert an alternating current into a direct current; there is a phase difference between a control signal of the second bridge arm topology and a control signal of the third bridge arm topology;

the first bridge arm topology and the inductor constitute a Buck converter for stepping down an input voltage, the second bridge arm topology and the inductor constitute a Boost converter for stepping up an input voltage, and the second bridge arm topology, the third bridge arm topology and the rectifier module constitute a phase-shifted full-bridge converter for stepping down or stepping up an input voltage; the DC-DC converter multiplexes the inductor and the second bridge topology.

Preferably, the two ends of the first bridge arm topology serve as an DC input end of the DC-DC converter, the capacitor serves as a first DC output end of the DC-DC converter, and an output end of the rectifier module serves as a second DC output end of the DC-DC converter.

Preferably, two ends of the first bridge arm topology serve as a first DC input end of the DC-DC converter, the capacitor serves as a second DC input end of the DC-DC converter, and an output end of the rectifier module serves as a first DC output end of the DC-DC converter.

Preferably, the rectifier module comprises a transformer and two rectifier diodes, a primary side of the transformer serves as the input end of the rectifier module, taps on both ends of a secondary side of the transformer are each connected in series with a rectifier diode, the other ends of the two rectifier diodes are connected as a first port of the output end of the rectifier module, and a center tap of the transformer serves as a second port of the output end of the rectifier module.

Preferably, each of the switching tubes of the first bridge arm topology is connected in parallel with a diode and a capacitor to enable soft switching of the switching tubes in the first bridge arm topology.

Preferably, the DC-DC converter further comprises a resonant inductor and a DC blocking capacitor, wherein the resonant inductor, the primary coil of the transformer and the DC blocking capacitor are sequentially connected in series to form a series branch, the series branch has one end connected to the coupling point formed by connecting the second switching tube and the fifth switching tube in series and the other end connected to the coupling point formed by connecting the third switching tube and the sixth switching tube in series, and each of the switching tubes of the second bridge arm topology and the third bridge arm topology is connected in parallel with a diode and a capacitor to enable soft switching of each of the switching tubes of the second bridge arm topology and the third bridge arm topology.

Preferably, the diodes and capacitors connected in parallel with the switching tubes are parasitic devices or external devices of the switching tubes.

Preferably, the DC-DC converter further includes an output filter; the output filter includes a filter inductor and a filter capacitor;

the filter inductor has one end connected to a first terminal of the output end of the rectifier module, and the other end serving as a first terminal of the DC output end of the DC-DC converter;

the filter capacitor has one end connected to the other end of the filter inductor and the other end connected to a second terminal of the output end of the rectifier module, the other end of the filter capacitor serving as a second terminal of the DC output end of the DC-DC converter.

Preferably, the DC-DC converter further includes a converter filter capacitor which is connected in parallel to the first bridge arm topology and used for smoothing a voltage.

In general, by comparing the above technical solution of the present inventive concept with the prior art, the present invention has the following beneficial effects:

1. by utilizing the structural characteristics, an inductor L1 and a half bridge (that is, the second bridge arm topology formed by the second switching tube (Q2) and the fifth switching tube (Q5) in series) are multiplexed, so that the converter can be made compact, which reduces the cost, and the number of switching tubes is reduced, thus reducing the switching loss under the same operating conditions.

2. soft switching of each switching tube is achieved, and MOSFETs are used instead of diodes in the general Buck converter to achieve synchronous rectification. Through the soft switching technology and synchronous rectification technology, switching loss and on-state loss are reduced, thereby improving the efficiency of the converter.

3. by reducing the switching loss, the switching frequency can be greatly increased. This not only improves the output waveform, but also reduces the filtering difficulty and reduces the volume of the filter. In addition, when the voltage frequency is increased, the transformer is no longer so easily saturated, and then the volume of the transformer can be reduced. Therefore, the present invention can achieve higher conversion efficiency while increasing the power density to a greater extent.

4. by reasonable application of the multi-stage series structure, a wide DC input range is achieved, and a large multiple of buck can be achieved, which is adapted to application requirements 5. The invention can realize multiple input and output ports, and thus can be applied to occasions requiring multiple voltage levels.

DETAILED DESCRIPTION OF THE EMBODIMENTS

The present invention is further described below in conjunction with embodiments and the accompanying drawings, which is illustrative but not limitative of the present invention.

The present invention provides a DC-DC converter topology with three ports, which can be used in a DC power supply place. The topology makes full use of the structural characteristics of the converter to multiplex the devices, which saves the cost, and introduces synchronous rectification technology, which reduces on-state voltage drop and on-state loss. Meanwhile, soft switching is achieved for all switching tubes to reduce the switching loss, which can increase the switching frequency and ensure the efficiency of the device. In addition, due to the multi-stage conversion, multiple DC output ports are provided, and through rational design, the converter topology has a wide range of DC input and can achieve a large multiple of buck.

Figure 1:
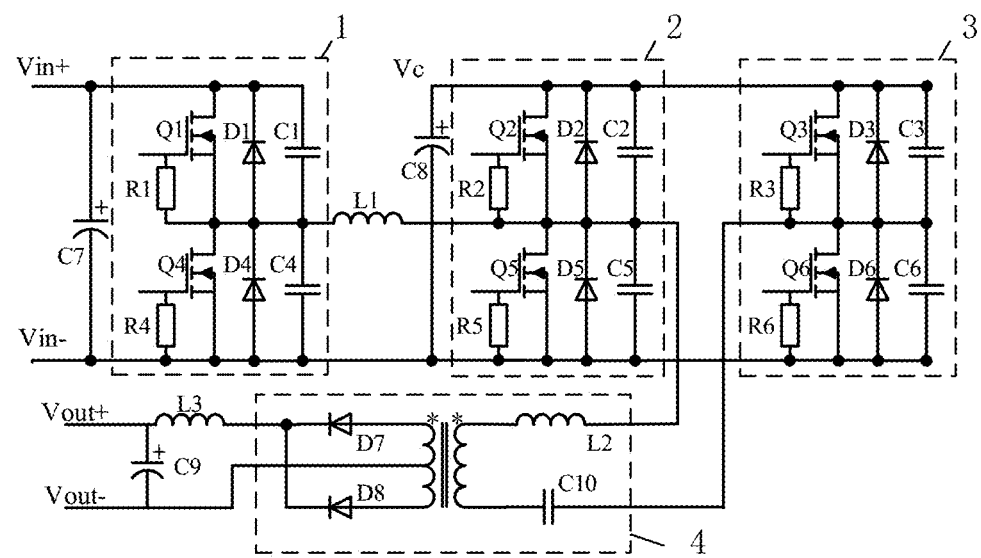
FIG. 1 is a DC-DC converter topology according to the present invention.

The DC-DC converter topology according to the present invention successively includes, as shown in FIG. 1, a converter filter capacitor C7, a Buck converter, a Boost converter and a phase-shifted full-bridge converter, when seen from the main input port. The converter filter capacitor is used for smoothing the voltage, As shown in FIG. 1, a capacitor C8 is connected in parallel at an input end of the phase-shifted full-bridge converter, that is, an output end of the Boost converter to virtualize a DC bus. The virtualized DC bus can be used as an input port or as an output port. The phase-shifted full-bridge converter includes an inverter bridge and a rectifier module, and the output end of the rectifier module is another DC output port of the topology.

In the topology, the Buck converter portion is composed of a first bridge arm topology formed by a first switching tube Q1 and a fourth switching tube Q4 in series, and an inductor L1. The inductor L1 has one end connected to a coupling point formed by connecting the first switching tube Q1 and the fourth switching tube Q4 in series. In the Buck converter circuit portion, MOSFETs are used instead of diodes to achieve synchronous rectification, and the switching tubes can also use other types of switching tubes.

The Boost converter portion is composed of a second bridge arm topology formed by the inductor L1, a second switching tube Q2 and a fifth switching tube Q5 in series, and a capacitor C8. The inductor L1 has the other end connected to a coupling point formed by connecting the second switching tube Q2 and the fifth switching tube Q5 in series. The capacitor C8 is connected between positive and negative input ports of the Boost converter. Similarly, MOSFETs are used instead of diodes in the general Boost converter. The Buck converter and the Boost converter are connected in series to form the front-stage DC-DC converter, and they share the inductor L1. The inductor L1 can be a single inductor or an equivalent inductor formed by multiple inductors.

The phase-shifted full-bridge converter portion is composed of the second bridge arm topology formed by the second switching tube Q2 and the fifth switching tube Q5 in series, a third bridge arm topology formed by a third switch transistor Q3 and a sixth switch transistor Q6 in series, a resonant inductor L2, a DC blocking capacitor C10 and a rectifier module. The rectifier module includes a transformer T1 and diodes D7 and D8. The second bridge arm topology serves as a leading leg of the phase-shifted full-bridge converter, and the third bridge arm topology serves as a lagging leg of the phase-shifted full-bridge converter. The resonant inductor L2 includes the leakage inductance of the transformer. The primary side of the transformer T1 is connected in series to the resonant inductor L2 and the DC blocking capacitor C10, and two ends of this series branch are respectively connected to the coupling point formed by connecting the second switching tube Q2 and the fifth switching tube Q5 in series and the coupling point formed by connecting the third switching tube Q3 and the sixth switching tube Q6 in series. Two ends of the secondary side of the transformer T1 are respectively connected in series with the diodes D7 and D8, and the other ends of the two diodes are connected together. A coupling point formed by connecting the diodes D7 and D8 serves as a first terminal of the output end of the phase-shifted full-bridge converter, and a center tap of the transformer T1 serves as a second terminal of the output end of the phase shifted full bridge converter.

The DC-DC converter further includes a filter inductor L3 and a filter capacitor C9. The filter inductor L3 is connected to the coupling point formed by connecting the diodes D7 and D8, and is also connected in series to the filter capacitor C9 and the center tap of the secondary side of the transformer T1. The filter inductor L3 and the filter capacitor C9 constitute an output filter, which is a low pass filter. Two end of the filter capacitor C9 serve as an output port of the DC-DC converter.

It can be seen that the Buck converter portion and the phase-shifted full-bridge converter portion multiplex the second bridge arm topology formed by the second switching tube Q2 and the fifth switching tube Q5 in series, so that the converter can be made compact, which reduces the cost, and the number of switching tubes is reduced, thus reducing the switching loss under the same operating conditions.

In addition, each switching tube is reversely connected in parallel with a diode, and also is connected in parallel with a capacitor. The diodes and capacitors can be parasitic devices of the switching tubes, or can be external independent devices. With these diodes and capacitors, zero-voltage switching (ZVS) can be achieved.

The working principle of soft switching achieved by the Buck converter is as follows: the working mode of the Buck converter portion in this topology is inspected, and since each switching tube is connected in parallel with a capacitor, when the switching tube is switched from ON state to OFF state, the voltage across the switching tube will rise relatively slowly, so that the higher switching current is staggered, thereby achieving zero voltage turn-off and reducing the turn-off loss. When the switching tube is switched from OFF state to ON state, due to the resonance formed by the capacitor and the inductor, the voltage across the capacitor will pass 0V. At this time, the diode is turned on, the voltage across the switching tube is clamped at 0V, and thus, the switching tube can be turned on at zero voltage, thereby achieving zero voltage turn-on and reducing the turn-on loss. The above is the soft switching implementation of the Buck circuit. In order to ensure the implementation of the soft switching of the front-stage Buck converter, the inductor current needs to be able to drop to 0A. Therefore, the value of the inductor can be reasonably designed to operate the front-stage DC-DC converter in the discontinuous mode (DCM).

The Boost circuit portion and the phase-shifted full-bridge converter portion in the DC-DC converter topology share the bridge arm formed by the second switching tube Q2 and the fifth switching tube Q5 in series. Since the bridge arm of the phase-shifted full bridge converter adopts phase shifting control and the duty cycle of the switching tube of the inverter bridge is fixed, the duty cycle D of the Boost converter is also fixed. Considering that the Boost converter is also in the discontinuous mode, the actual transformation ratio will be greater than $1/(1-D)$.

The phase-shifted full-bridge converter portion in the DC-DC converter topology realizes the adjustment of the output voltage through phase shifting control, and all the switching tubes on the inverter bridge can realize soft switching.

The input end of the phase-shifted full bridge converter receives a DC input (in this topology, the output of the Boost converter), an AC bridge arm voltage is obtained through the inverter bridge, and then output to the primary side of the transformer. The transformer can provide a transformer ratio, and a center tap and rectifier diodes are provided on the secondary side of the inverter, thereby achieving uncontrolled rectification.

Through phase shifting control of the two half bridges of the inverter bridge, there is an adjustable phase difference between control signals of the two half bridges, and by controlling this phase difference, the duty ratio of the output voltage can be controlled, thereby controlling the magnitude of the output voltage. Therefore, in the two half bridges, the second bridge arm consisting of the second switching tube Q2 and the fifth switching tube Q5 is called a leading leg, and the third bridge consisting of the third switching tube Q3 and the sixth switching tube Q6 is called a lagging leg. Between the two half bridges, in addition to the rectifier module, a resonant inductor L2 and a DC blocking capacitor C10 are connected in series. The resonant inductor and the capacitors connected in parallel at both ends of the switching tubes form a resonance under a certain operating mode, thereby enabling zero-voltage switching of the switching tubes.

The soft switching of the phase-shifted full-bridge circuit is realized as follows: when the switching tube is switched from ON state to OFF state, the voltage across the switching tube will rise relatively slowly due to capacitor charging, so that the higher switching current is staggered, thereby achieving zero voltage turn-off and reducing the turn-off loss. When the switching tube is switched from OFF state to ON state, due to the resonance formed by the capacitor and the inductor, the voltage across the capacitor will drop to 0V at a certain moment. At this time, the diode is turned on, the voltage across the switching tube is clamped at 0V, and thus, the switching tube can be turned on at zero voltage, thereby achieving zero voltage turn-on and reducing the turn-on loss.

Figure 2:
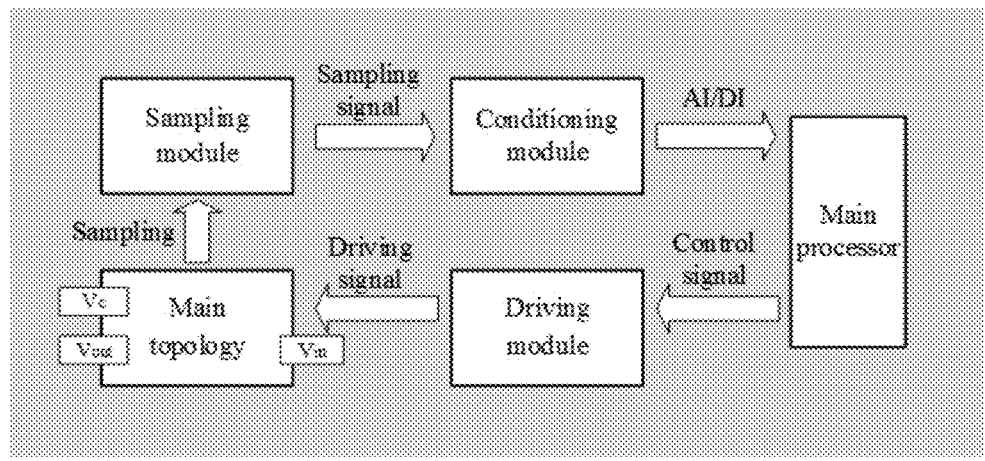
FIG. 2 is a frame diagram of a typical peripheral circuit of the DC-DC converter topology according to the present invention.

For clearer description of the present invention, a typical peripheral circuit of the DC-DC converter is illustrated in FIG. 2, and includes a main processor module, a sampling module, a driving module and a conditioning module. The output of the Buck converter is sampled by the sampling module, processed by the conditioning circuit, and then input to the processor. According to a designed program, the processor outputs a control signal to the driving module so as to drive the first switching tube Q1 and the fourth switching tube to perform synchronous operation and complementary switching. In order to avoid the shoot-through state, dead bands can be provided for the first switching tube Q1 and the fourth switching tube Q4. Meanwhile, the output of the rectifier module is sampled, processed by the conditioning module, and then input to the processor. According to the control program designed in the processor, the processor obtains the phase shifting magnitude and outputs a control signal to the driving module, and then the driving module outputs a driving signal to control on/off of the switching tubes in the second bridge arm topology and the third bridge arm topology, thereby constituting a closed loop containing the controller.

In the present invention, the front-stage DC-DC converter is formed by the Buck converter and the Boost converter in series, and is a direct DC converter, while the back-stage converter is a phase-shifted full-bridge converter including an inverter bridge and a rectifier converter as well as an isolated transformer, and is an indirect DC converter.

The topology makes full use of the structural characteristics of the converter to multiplex the devices, which saves the cost, and introduces synchronous rectification technology, which reduces on-state voltage drop and on-state loss. Meanwhile, soft switching is achieved for all switching tubes to reduce the switching loss, which can increase the switching frequency and ensure the efficiency of the device. In addition, due to the multi-stage conversion, multiple DC output ports are provided, and through rational design, the converter topology has a wide range of DC input and can achieve a large multiple of buck.

It should be readily understood to those skilled in the art that the above description is only preferred embodiments of the present invention, and does not limit the scope of the present invention. Any change, equivalent substitution and modification made without departing from the spirit and scope of the present invention should be included within the scope of the protection of the present invention.

What is claimed is:

1. A DC-DC converter, characterized by comprising: an inductor, a rectifier module, a first bridge arm topology and a second bridge arm topology and a third bridge arm topology in parallel as well as a capacitor, wherein the first bridge arm topology includes a first switching tube and a fourth switching tube in series, the second bridge arm topology includes a second switching tube and a fifth switching tube in series, and the third bridge arm topology includes a third switching tube and a sixth switching tube in series; a negative pole of the first bridge arm topology is connected to a negative pole of the second bridge arm topology, and the inductor has one end connected to a coupling point formed by connecting the first switching tube and the fourth switching tube in series, and the other end connected to a coupling point formed by connecting the second switching tube and the fifth switching tube in series;

an input end of the rectifier module has one end connected to the coupling point formed by connecting the second switching tube and the fifth switching tube in series, and the other end connected to a coupling point formed by connecting the third switching tube and the sixth switching tube in series, and the rectifier module is used to convert an alternating current into a direct current; there is a phase difference between a control signal of the second bridge arm topology and a control signal of the third bridge arm topology;

the first bridge arm topology and the inductor constitute a Buck converter for stepping down an input voltage, the second bridge arm topology and the inductor constitute a Boost converter for stepping up an input voltage, and the second bridge arm topology, the third bridge arm topology and the rectifier module constitute a phase-shifted full-bridge converter for stepping down or stepping up an input voltage; the DC-DC converter multiplexes the inductor and the second bridge topology.

2. The DC-DC converter of claim 1, characterized in that two ends of the first bridge arm topology serve as an DC input end of the DC-DC converter, the capacitor serves as a first DC output end of the DC-DC converter, and an output end of the rectifier module serves as a second DC output end of the DC-DC converter.

3. The DC-DC converter of claim 1, characterized in that two ends of the first bridge arm topology serve as a first DC input end of the DC-DC converter, the capacitor serves as a second DC input end of the DC-DC converter, and an output end of the rectifier module serves as a first DC output end of the DC-DC converter.

4. The DC-DC converter of claim 1, characterized in that the rectifier module comprises a transformer and two rectifier diodes, a primary side of the transformer serves as the input end of the rectifier module, taps on both ends of a secondary side of the transformer are each connected in series with a rectifier diode, the other ends of the two rectifier diodes are connected as a first port of the output end of the rectifier module, and a center tap of the transformer serves as a second port of the output end of the rectifier module.

5. The DC-DC converter of claim 1, characterized in that each of the switching tubes of the first bridge arm topology is connected in parallel with a diode and a capacitor to enable soft switching of the switching tubes in the first bridge arm topology.

6. The DC-DC converter of claim 5, characterized in that the diodes and capacitors connected in parallel with the switching tubes are parasitic devices or external devices of the switching tubes.

7. The DC-DC converter of claim 1, characterized by further comprising a resonant inductor and a DC blocking capacitor, wherein the resonant inductor, the primary coil of the transformer and the DC blocking capacitor are sequentially connected in series to form a series branch, the series branch has one end connected to the coupling point formed by connecting the second switching tube and the fifth switching tube in series and the other end connected to the coupling point formed by connecting the third switching tube and the sixth switching tube in series, and each of the switching tubes of the second bridge arm topology and the third bridge arm topology is connected in parallel with a diode and a capacitor to enable soft switching of each of the switching tubes of the second bridge arm topology and the third bridge arm topology.

8. The DC-DC converter of claim 1, characterized in that the DC-DC converter further includes an output filter; the output filter includes a filter inductor and a filter capacitor;

the filter inductor has one end connected to a first terminal of the output end of the rectifier module, and the other end serving as a first terminal of the DC output end of the DC-DC converter;

the filter capacitor has one end connected to the other end of the filter inductor and the other end connected to a second terminal of the output end of the rectifier module, the other end of the filter capacitor serving as a second terminal of the DC output end of the DC-DC converter.

9. The DC-DC converter of claim 1, characterized in that the DC-DC converter further includes a converter filter capacitor which is connected in parallel to the first bridge arm topology and used for smoothing a voltage.

* * * * *